United States Patent
Niewiadomski et al.

(10) Patent No.: US 11,285,768 B2
(45) Date of Patent: Mar. 29, 2022

(54) VEHICLE SYSTEM AND METHOD FOR DETECTING TRAILER CONNECTION

(71) Applicant: Ford Global Technologies, LLC, Dearborn, MI (US)

(72) Inventors: Luke Niewiadomski, Dearborn, MI (US); Donald Jacob Mattern, Canton, MI (US); Douglas Rogan, Mountain View, CA (US); Roger Arnold Trombley, Ann Arbor, MI (US); Bruno Sielly Jales Costa, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 16/534,173

(22) Filed: Aug. 7, 2019

(65) Prior Publication Data
US 2021/0039460 A1 Feb. 11, 2021

(51) Int. Cl.
*B60D 1/64* (2006.01)
*B60D 1/28* (2006.01)
*B60R 11/04* (2006.01)

(52) U.S. Cl.
CPC ............... *B60D 1/64* (2013.01); *B60D 1/28* (2013.01); *B60R 11/04* (2013.01); *B60R 2300/50* (2013.01); *B60R 2300/802* (2013.01); *B60R 2300/808* (2013.01)

(58) Field of Classification Search
None
See application file for complete search history.

(56) References Cited

U.S. PATENT DOCUMENTS

| | | | |
|---|---|---|---|
| 6,396,397 B1 | 5/2002 | Bos et al. | |
| 7,378,947 B2 | 5/2008 | Daura Luna et al. | |
| 9,446,713 B2 | 9/2016 | Lu et al. | |
| 9,840,119 B1 * | 12/2017 | Melaragni | G08B 21/18 |
| 9,987,892 B2 | 6/2018 | Ghannam et al. | |
| 10,000,207 B2 | 6/2018 | Lavoie | |
| 10,059,161 B1 | 8/2018 | Salter et al. | |
| 2014/0012465 A1 | 1/2014 | Shank et al. | |
| 2014/0160276 A1 | 6/2014 | Pliefke et al. | |
| 2014/0340510 A1 | 11/2014 | Ihlenburg et al. | |

(Continued)

FOREIGN PATENT DOCUMENTS

CN 106864187 A 6/2017

*Primary Examiner* — Rebecca A Volentine
(74) *Attorney, Agent, or Firm* — Raymond Copiellie; Price Heneveld LLP (57) ABSTRACT

A vehicle has a trailer hitch, a vehicle electrical connector configured to electrically connect to a trailer electrical connector, and an imaging system oriented to captures images proximate to the trailer hitch. The vehicle also includes a proximity sensing system arranged to sense objects proximate to the trailer hitch and generate a proximity signal, an electrical connection detection system to detect an electrical connection to the vehicle trailer connector and generate an electrical connection signal, and a controller processing the captured images, the proximity signal and the electrical connector signal and determining a connection state of a trailer to the vehicle based on the captured images, the proximity sensor and the electrical connector signal, and generating an output indicative of the determined connection state.

14 Claims, 12 Drawing Sheets

(56) References Cited

U.S. PATENT DOCUMENTS

| | | | |
|---|---|---|---|
| 2015/0203128 A1* | 7/2015 | Strano | B60R 1/003 |
| | | | 340/431 |
| 2016/0052548 A1 | 2/2016 | Singh et al. | |
| 2016/0137126 A1 | 5/2016 | Fursich et al. | |
| 2018/0001928 A1* | 1/2018 | Lavoie | B60D 1/62 |
| 2018/0068566 A1* | 3/2018 | Prasad | B60W 30/12 |
| 2018/0361929 A1 | 12/2018 | Zhang et al. | |
| 2019/0225154 A1* | 7/2019 | Ionascu | B60D 1/62 |

\* cited by examiner

VEHICLE SYSTEM AND METHOD FOR DETECTING TRAILER CONNECTION

FIELD OF THE INVENTION

The present invention generally relates to detecting a vehicle trailer, and more particularly relates to a system and vehicle for detecting the connection state of a trailer to a vehicle.

BACKGROUND OF THE INVENTION

Many motor vehicles are commonly equipped with trailer hitches that enable the vehicle to connect with and tow a trailer. With many trailer hitch arrangements, the trailer has a coupler that engages onto and connects to the vehicle trailer hitch typically via a hitch ball. The hitch coupler typically includes a coupler lock that is actuated by a user between a locked and unlocked position by actuating a coupler lock lever. It may be desirable to detect that the vehicle and trailer is in a connected state.

SUMMARY OF THE INVENTION

According to a first aspect of the present invention, a vehicle is provided. The vehicle includes a trailer hitch, a vehicle electrical connector configured to electrically connect to a trailer electrical connector, and an imaging system oriented to captures images proximate to the trailer hitch. The vehicle also includes a proximity sensing system arranged to sense one or more objects proximate to the trailer hitch and generate a proximity signal, an electrical connection detection system configured to detect an electrical connection of the trailer electrical connector to the vehicle electrical connector and generate an electrical connection signal, and a controller processing the captured images, the proximity signal and the electrical connector signal and determining a connection state of a trailer to the vehicle based on the captured images, the proximity sensor and the electrical connector signal, and generating an output indicative of the determined connection state.

Embodiments of the first aspect of the invention can include any one or a combination of the following features:
  the controller further assigns a weighted value to each of the captured images, the proximity signal and the electrical connector signal and determines the connection state based on the weighted signals;
  the weighted values comprise a first set of weighted values when the vehicle is moving;
  the controller determines that the vehicle is at a standstill and assigns a different second set of weighted values when the vehicle is at standstill as compared to when the vehicle is moving;
  the vision system comprises a camera;
  the proximity sensor system comprises one or more radar sensors for detecting one or more corners of an object trailer rearward of the vehicle;
  the controller further detects a target on a trailer in the captured images and assigns a weighted value to the target detection, wherein the determined state is further based on the target signal of the detected target;
  the electrical connection detection system detects the trailer electrical connector and a yaw rate sensor connector;
  a display for displaying the output as a warning to a driver of the vehicle; and
  the trailer hitch comprises a tow ball.

According to a second aspect of the present invention, a trailer detection system for a vehicle is provided. The trailer detection system includes an imaging system oriented to captures images proximate to a trailer hitch on the vehicle, a proximity sensing system arranged to sense one or more objects proximate to the trailer hitch and generate a proximity signal, and an electrical connection detection system configured to detect an electrical connection of a vehicle electrical connector to a trailer electrical connector and generate an electrical connection signal. The trailer detection system for a vehicle also includes a controller processing the captured images, the proximity signal and the electrical connector signal and determining a connection state of a trailer to the vehicle based on the captured images, the proximity sensor and the electrical connector signal, and generating an output indicative of the determined connection state.

Embodiments of the second aspect of the invention can include any one or a combination of the following features:
  the controller further assigns a weighted value to each of the captured images, the proximity signal and the electrical connector signal and determines the connection state based on the weighted signals;
  the weighted values comprise a first set of weighted values when the vehicle is moving and, wherein the vehicle controller determines that the vehicle is at a standstill and assigns a different second set of weighted values when the vehicle is at standstill as compared to when the vehicle is moving;
  the proximity sensor system comprises one or more radar sensors for detecting one or more corners of an object trailer rearward of the vehicle; and
  a display for displaying the output as a warning to a driver of the vehicle.

According to yet a third aspect of the present disclosure, a method for detecting a state of a trailer connected to a vehicle is provided. The method includes the steps of capturing images proximate to a trailer hitch on the vehicle with an imaging system, sensing one or more objects proximate to the trailer hitch with a proximity sensing system and generating a proximity signal, detecting an electrical connection of a vehicle electrical connector to a trailer electrical connector and generating an electrical connection signal, and processing the captured images, the proximity signal and the electrical connector signal and determining a connection state of a trailer to the vehicle based on the captured images, the proximity sensor and the electrical connector signal, and generating an output indicative of the determined connection state.\

Embodiments of the third aspect of the invention can include any one or a combination of the following features:
  the processing further assigns a weighted value to each of the captured images, the proximity signal and the electrical connector signal and determines a trailer to vehicle connected state based on the weighted signals;
  the weighted values comprise a first set of weighted values when the vehicle is moving and, wherein the vehicle controller determines that the vehicle is at a standstill and assigns a different second set of weighted values when the vehicle is at standstill as compared to when the vehicle is moving, the proximity sensor system comprises one or more radar sensors for detecting one or more corners of an object trailer rearward of the vehicle; and
  displaying the output on a display as a warning to a driver of the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
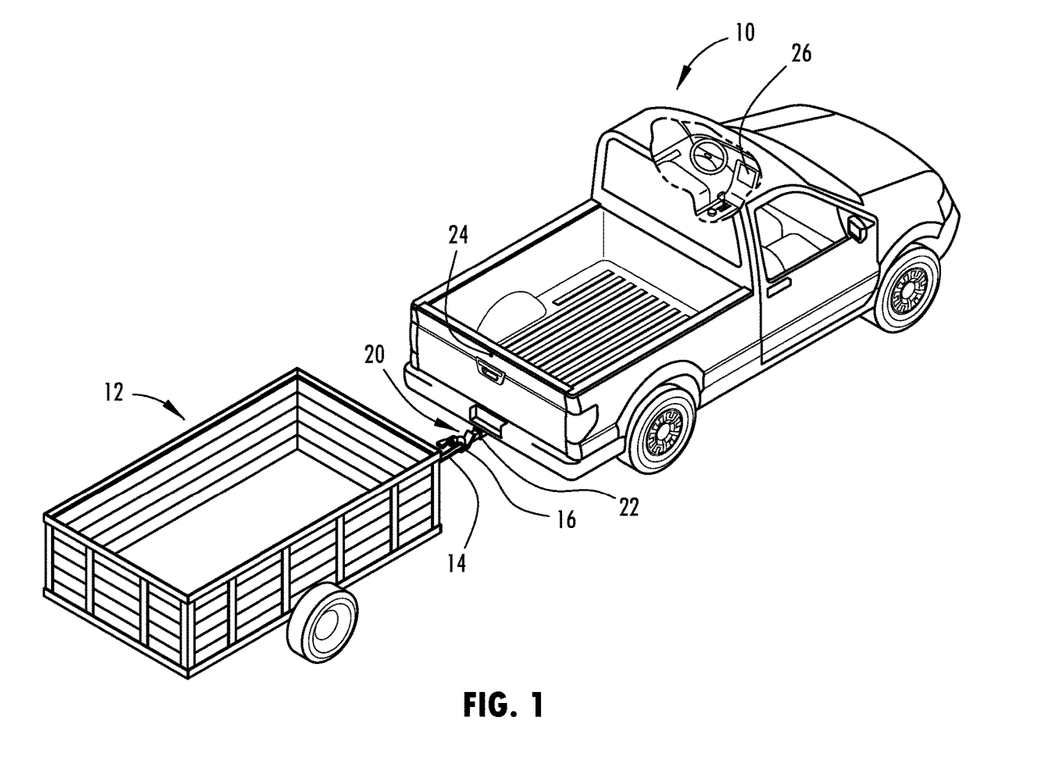
FIG. 1 is a perspective view of a motor vehicle having a trailer hitch connected to a trailer and a trailer connection detection system, according to one embodiment.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-15, a vehicle 10 and a trailer connection detection system 20 for detecting a connection state of a trailer with respect to the vehicle 10 is generally illustrated, according to one embodiment. The vehicle 10 includes a tow or trailer hitch 22 and is equipped with the trailer detection system 20. The vehicle includes the trailer hitch 22, a vehicle electrical connector 60 configured to electrically connect to a trailer electrical connector 64, an imaging system 24 oriented to captures images proximate to the trailer hitch 22, a proximity sensing system 50 arranged to sense one or more objects proximate to the trailer hitch 22 and generate a proximity signal, an electrical connection detection system 60 configured to detect an electrical connection to the vehicle trailer connector 60 and generate an electrical connection signal, and a controller 40 processing the captured images, the proximity signal and the electrical connector signal and determining the state of a trailer connection to the vehicle based on the captured images, the proximity sensor and the electrical connector signal, and generating an output indicative of the determined connection state Referring now to FIG. 1, the vehicle 10 is generally illustrated as a motor vehicle having wheels for travel on the ground, such as a roadway. The motor vehicle 10 is equipped with a vehicle trailer hitch 22 mounted or assembled to the rear end of the vehicle 10. The vehicle trailer hitch 22 generally includes a tow bar extending from a bracket and having a hitch connecting feature such as a tow ball. The trailer 12 has a trailer tongue 14 extending forward at the front end with a trailer coupler 16 provided on the front end thereof. The trailer coupler 16 is configured to engage the tow ball on the vehicle trailer hitch 22 to connect the trailer 12 to the vehicle 10 and allow the trailer 12 to articulate about the coupler to hitch connection as the vehicle 10 maneuvers with left and right steering directions while travelling.

The vehicle 10 is equipped with the trailer connection detection system 20 for detecting a state of the trailer 12 connected to the vehicle trailer hitch 22. The trailer connection detection system 20 includes an imaging system 24 shown as a camera which is shown located at the rear end of the vehicle 10 and oriented to capture images of the vehicle trailer hitch 22 from an imaging perspective directed rearward of the vehicle 10. The imaging system 24 is an image generating device that is shown located in an upper portion of the tailgate of the vehicle 10 which is shown as a pick-up truck in one example. However, it should be appreciated that the imaging system 24 may be located in other locations on any towing vehicle that enable images of the front portions of the trailer 12, such as the trailer tongue 14 and the trailer coupler 16 and the connecting portion of the vehicle trailer hitch 22 to be captured. The captured images are stored in memory and processed by a controller of the trailer connection detection system 20 as described herein.

The trailer connection detection system 20 also includes a human machine interface (HMI) in the form of a touchscreen display 26 shown located within a passenger compartment of the vehicle 10. The display 26 may be located in a position that is readily viewable by a driver of the vehicle 10 and may provide a visual warning as an output. In the example shown, the display 26 is provided within an entertainment system located within the dashboard of the vehicle generally forward of the driver. The HMI display or other device(s) within vehicle 10 may provide other outputs such as audible and/or visible outputs.

The vehicle 10 is equipped with the trailer connection detection system 20 to detect the trailer 12 in a connected or disconnected state with respect to the vehicle 10. This is achieved by employing a controller that processes the captured images, the proximity sensor signals and the electrical connection signal, and determines a connected or disconnected state of the trailer 12, and generates an output indicative of the determined connection state of the trailer 12. The output may be in the form of a displayed message, such as a warning, visually shown on the display 26, another visual output or an audible output or any other output indicative of the determined state of the trailer connection and may perform any control action required in response to the output.

Figure 2:
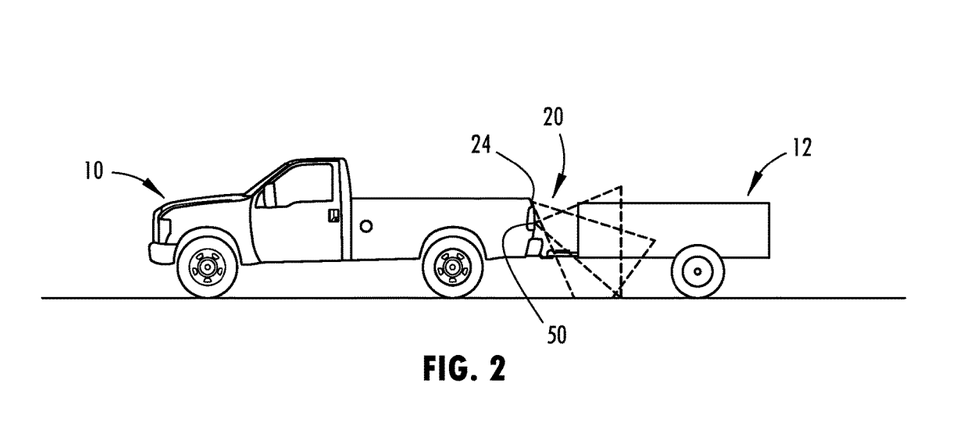
FIG. 2 is a side view of the vehicle and trailer combination illustrating sensing fields of imaging and proximity detection systems.
Figure 3:
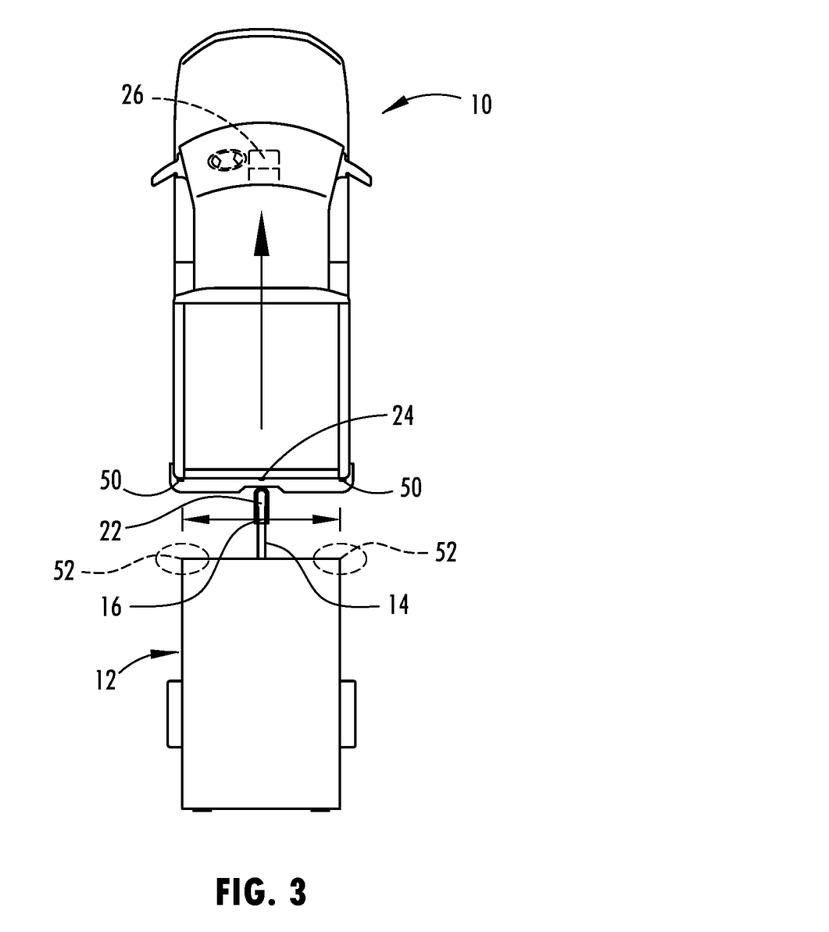
FIG. 3 is a top view of the vehicle and trailer combination further illustrating detection areas of the sensing fields of the proximity sensing system.

The vehicle 10 is equipped with a proximity sensing system arranged to sense one or more objects proximate to the trailer hitch 22 and generate one or more proximity signals. The proximity sensing system 50 may include one or more radar sensors located at the rear end of the vehicle, such as a radar sensor in each of the two rear corners of the vehicle. In one example, the proximity sensing system 50 may include radar sensors located in the taillights of the vehicle as shown in FIG. 2. According to another embodiment, the proximity sensing system may employ ultrasonic sensors. The proximity sensing system 50 detects one or more objects, such as one or more corners or edges of an object located rearward of the vehicle in a position where a trailer would be expected to be located when connected to the vehicle. For example, the proximity sensing system 50 may detect corner areas 52 or features on trailer 12 as shown in FIG. 3.

Figure 4:
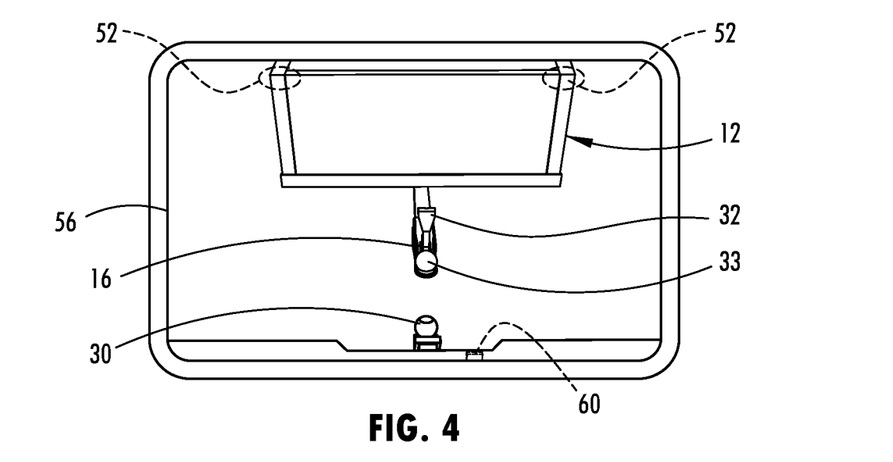
FIG. 4 is an image captured by the imaging system of the vehicle showing the trailer in a disconnected state.
Figure 5:
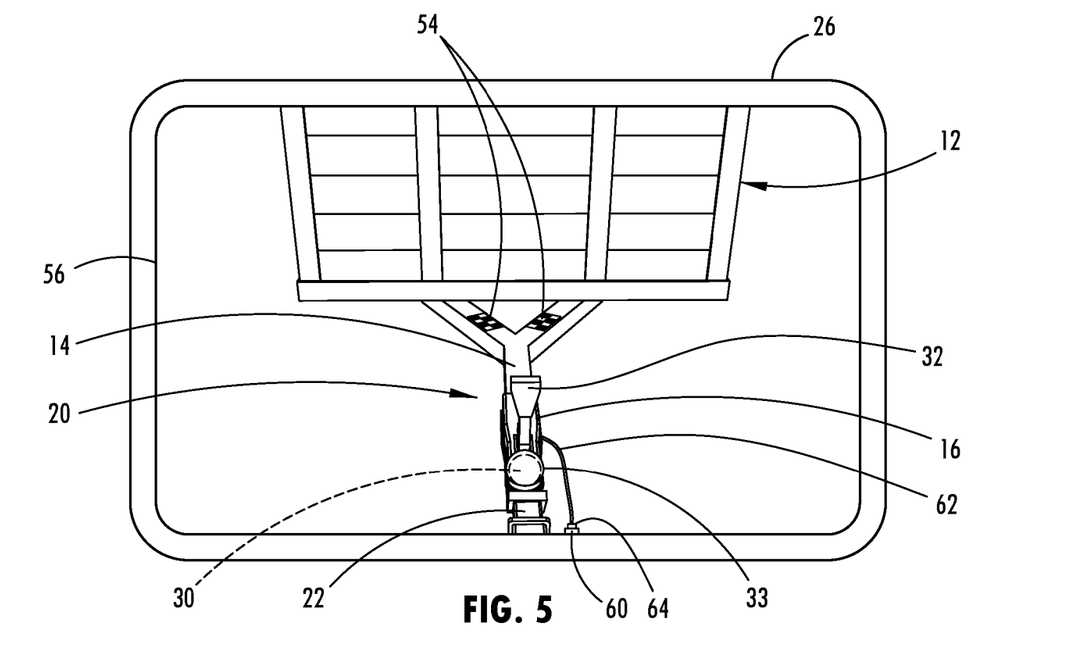
FIG. 5 is an image captured by the imaging system of the vehicle showing the vehicle trailer in a partially connected state with the trailer coupler in an unlocked position.
Figure 6:
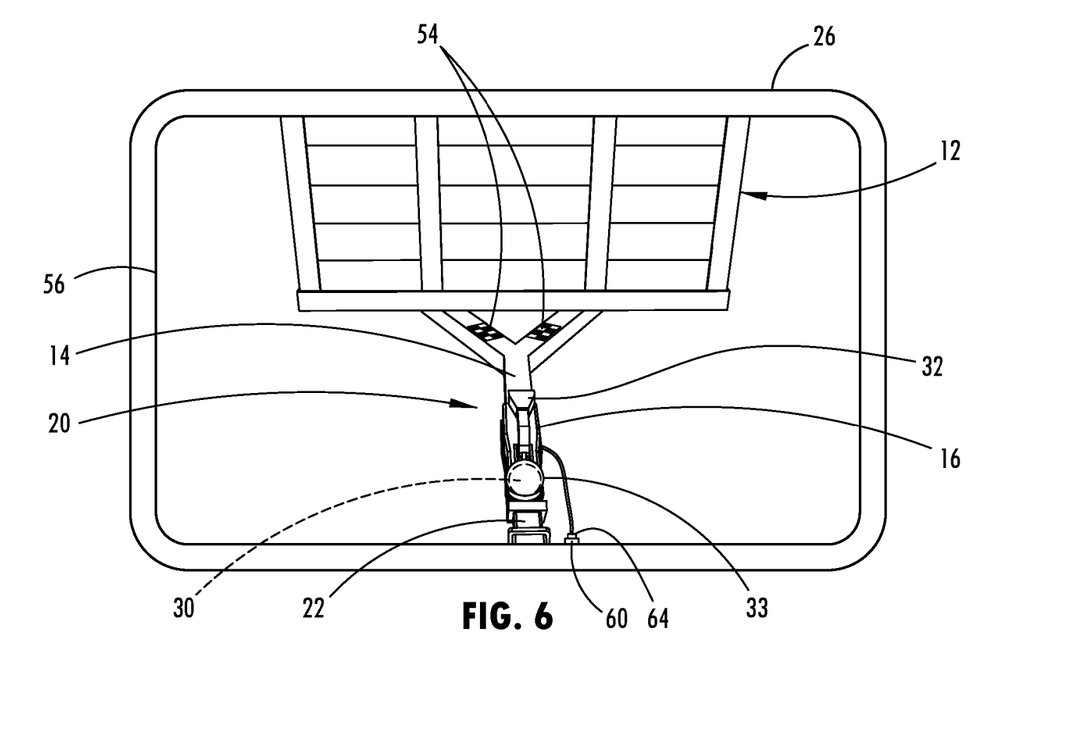
FIG. 6 is an image captured by the imaging system of the vehicle showing the trailer in a fully connected state with the trailer coupler in a locked position.

The vehicle 10 further includes an electrical connection detection system configured to detect an electrical connection to the vehicle electrical connector 60 and generate an electrical connection signal. The vehicle electrical connector 60 as seen in FIGS. 4-6 is configured to receive a trailer electrical connector 64 which is connected to an electrical harness 60 connected to the trailer 12. Trailer electrical connector 64 is configured to matingly engage vehicle electrical connector 60 to form an electrical connection to supply power and signals between the vehicle and the trailer as is known in the art. The electrical connection detection system detects whether the trailer electrical connector 64 is connected to the vehicle electrical connector 60 and generates an electrical connection signal based thereon. The electrical connector detection system may detect a trailer electrical connector 64 connected thereto by sensing electrical current flow or voltage at the connector or in the wire harness. Generally, when the vehicle 10 and trailer 12 are not connected as shown in FIG. 4, the trailer electrical connector 64 is not connected to the vehicle electrical connector 60. However, when the trailer 12 is connected to the vehicle 10 via the hitch coupler and trailer hitch, the trailer electrical connector 64 is typically plugged into and connected to the vehicle electrical connector 60. However, an operator may disconnect the trailer electrical connector 64 from the vehicle electrical connector 60, particularly when used to launch a boat in water such that the monitoring of electrical connection alone may not necessarily be an accurate determination of a connected vehicle to trailer state. The trailer connection detection system may detect the trailer electrical connector and/or a yaw rate sensor connector.

The trailer 12 as shown in FIGS. 4-6 includes a trailer coupler 16 that is configured to engage a tow ball 30 on the vehicle hitch 22. When the trailer 12 is disconnected from the vehicle 10 as seen in FIG. 4, the trailer coupler 16 has a lever 32 shown in a raised upward disconnected position in which the trailer coupler 16 is unlocked. When the trailer 12 is connected to the vehicle 10, a semi-spherical cup or receiver 33 of the coupler 16 engages the tow ball 30 and the lever 32 of the trailer coupler 16 initially is in the upward unlocked position as shown in FIG. 5. The lever 32 may be manually moved to a downward locked position as shown in FIG. 6 in which the trailer coupler 16 locks the receiver 33 onto the tow ball 30. In this locked position shown in FIG. 6, the trailer 12 is fully connected to the vehicle hitch 22 of the vehicle 10.

In addition, the trailer 12 is shown having targets 54 on the trailer tongue 14 shown in FIGS. 5 and 6. The targets 54 may be stickers with a designated printed pattern that are adhered to the trailer tongue 14 or may be features of the trailer tongue 14. The imaging system 24 may process the captured images acquired by the camera and identify the presence of one or more targets 54 on the trailer 12. By identifying the location and size of each target 54, the processed images containing the target 54 or targets may be used to determine a vehicle trailer connection state.

Figure 7:
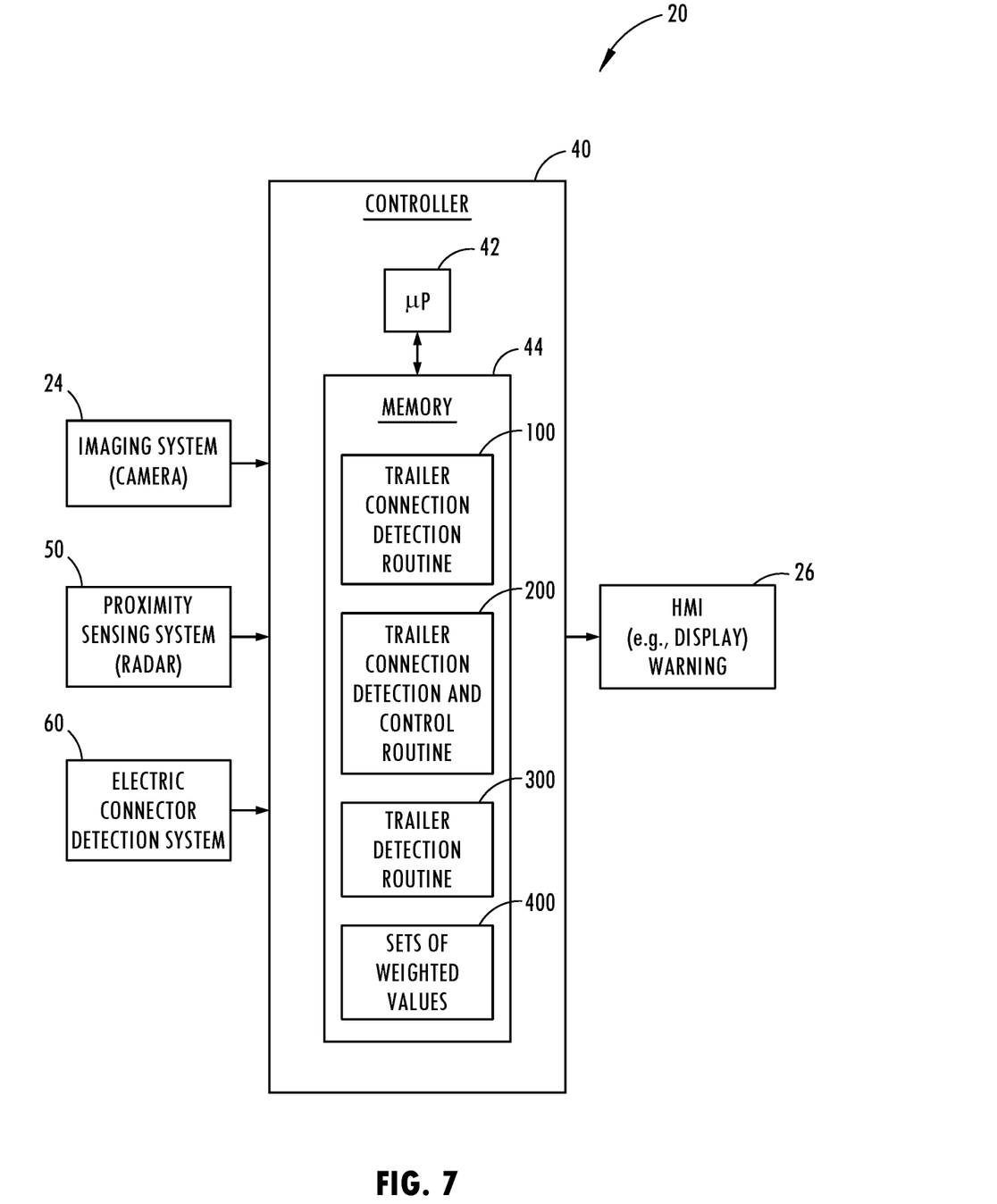
FIG. 7 is a block diagram further illustrating the trailer connection detection system, according to one embodiment.

Referring to FIG. 7, the trailer connection detection system 20 is generally illustrated having a controller 40 that receives as inputs the images captured by the imaging system 24, the proximity sensing system 50, and the electrical connector detection system 60. The controller 40 processes the inputs, generates an output and provides the output to the HMI display 26 as a visual warning. The controller 40 may include a shared controller on the vehicle 10 or may be a dedicated controller dedicated to detecting the trailer connection state and providing an output signal and control functions based thereon. The controller 40 may include a microprocessor 42 or other analog and/or digital process circuitry. Additionally, the controller 40 includes memory 44 which may store one or more trailer detection and control routines 100, 200 and 300 that are processed by the microprocessor 42. Also stored in memory are sets of weighted values 400 which may be assigned to different detection criteria and are weighted depending on whether the vehicle is in standstill or is moving and are used to determine the connection state of a trailer to the vehicle. Also stored in memory 44 may be known trailer images in select positions including positions that show connected, disconnected, coupler locked and coupler unlocked states.

Figure 8:
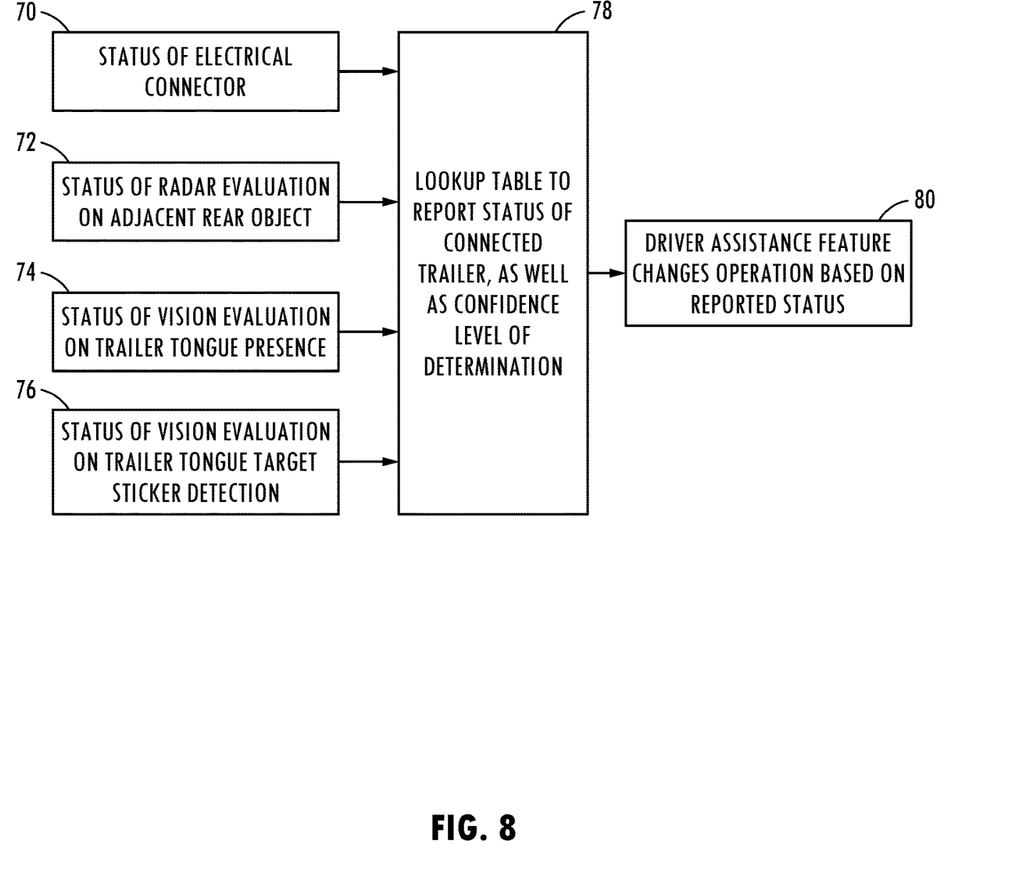
FIG. 8 is a block diagram illustrating decisions and settings provided by the controller with the use of a lookup table.

Referring to FIG. 8, functional aspects of the controller shown in FIG. 7 are further illustrated, according to one embodiment. The controller may receive or identify the status of the trailer to vehicle electrical connection in block 70, receive or identify the status of the radar evaluation on adjacent rear objects in block 72, receive or identify the status of vision evaluation on the trailer tongue presence in block 74, and receive or identify the status of vision evaluation on the trailer tongue target sticker detection in block 76. The status of each of blocks 70-76 may be used with a lookup table to report the status of the connected trailer as well as the confidence level of the determination in block 78. One or more driver assistance features may change operation based on the reported status in block 80. For example, operation of a hitch assistance system may be changed.

Figure 9:
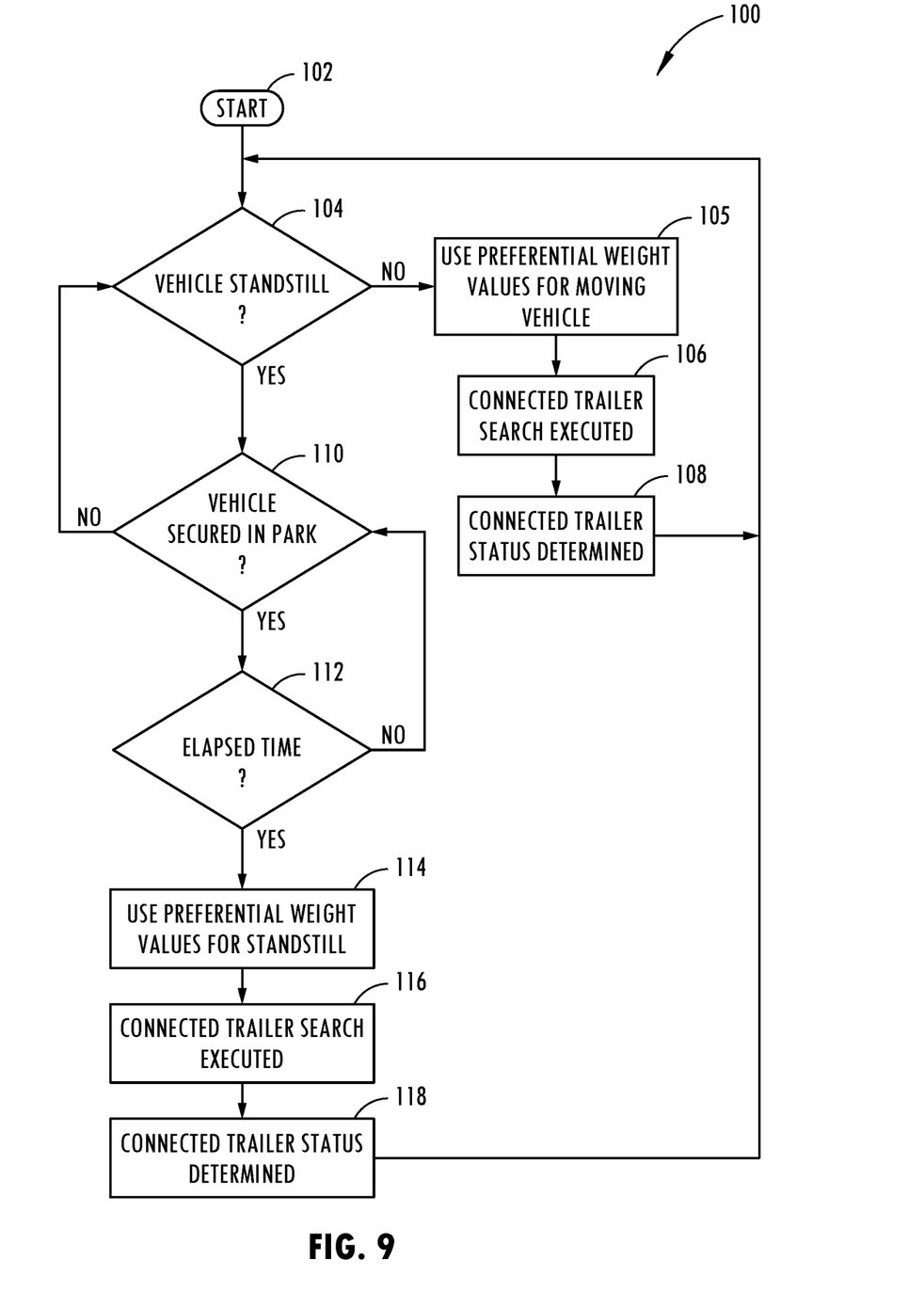
FIG. 9 is a flow diagram illustrating a routine for detecting the vehicle trailer connection status, according to one embodiment.

Referring to FIG. 9, a routine 100 for detecting the state of a trailer connected to a vehicle is illustrated, according to one embodiment. Routine 100 begins at step 102 and proceeds to decision step 104 to determine if the vehicle is at a standstill, i.e., the vehicle is not moving. The vehicle may be determined to be at standstill based on vehicle speed indicating no speed or the vehicle transmission being in a parked mode. If the vehicle is determined not to be at standstill, routine 100 proceeds to step 105 to use preferential weight values for a moving vehicle and then to step 106 to execute the connected trailer search and then to step 108 to determine the connected trailer status before returning to step 104. Step 106 of executing the connected trailer search and step 108 of determining the connected trailer status may be executed by routine 300 shown in FIGS. 11-15. The preferential weight values are assigned multipliers to the vision processing, the proximity sensing and electrical connector detection.

If the vehicle is determined to be at a standstill, routine 100 proceeds to decision step 110 to determine if the vehicle is secured and, if not, returns to step 104. The vehicle may be determined to be secured in park if the parking brake is applied or if the vehicle transmission is in the park position. If the vehicle is determined to be secured, routine 100 proceeds to decision step 112 to determine if a time period such as five seconds has elapsed. If the time period has not elapsed, routine 100 returns to step 110. Once the time period has elapsed, routine 100 proceeds to step 114 to use preferential weight values for a standstill vehicle condition. The preferential weight values are those weight values assigned to determine a vehicle trailer connection when the vehicle is at standstill which are different than the weight values applied for a moving vehicle. Next, at step 116, routine 100 executes the connected trailer search and at step 118 determines the connected trailer status using the preferential weight values for standstill before returning to step 104. Step 116 of executing the connected trailer search and step 118 of determining the connected trailer status may be executed by routine 30 shown in FIGS. 11-15.

Figure 10:
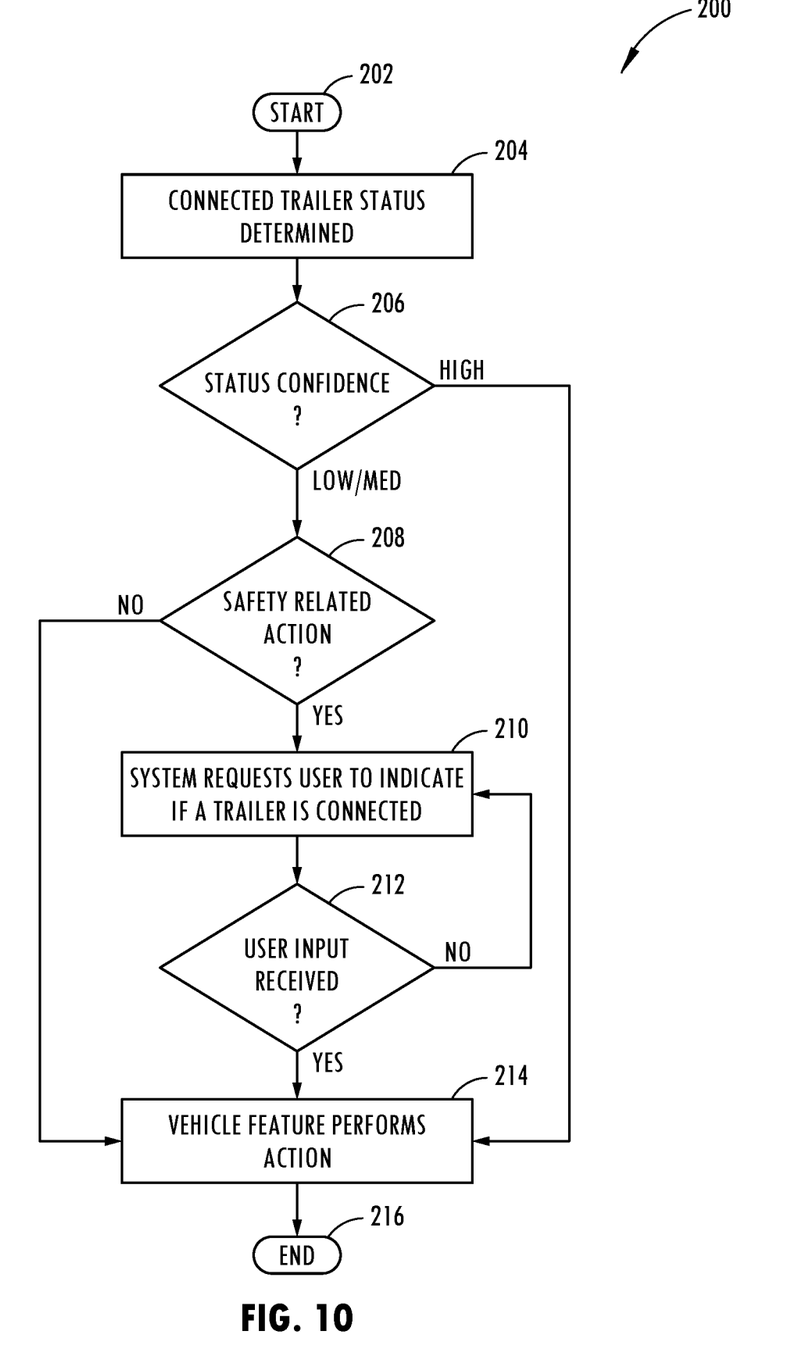
FIG. 10 is a flow diagram illustrating a routine for performing an action based on the vehicle trailer connection status, according to one embodiment.

Referring to FIG. 10, routine 200 for performing an action based on the trailer connected state is illustrated beginning at step 202 and proceeding to step 204 to determine the connected trailer status. The connected trailer status is determined by routine 300 shown in FIGS. 11-15. Next, at decision step 206, routine 200 decides if a status confidence is high or low/medium. If the status confidence is high, routine 200 proceeds to step 214 to command a vehicle feature to perform one or more actions before ending at step 216. The actions may include any vehicle related feature or operation. If the status confidence is determined to be low or medium, routine 200 proceeds to decision step 208 to determine if a safety related action is to be performed. If a safety related action is determined to be performed, routine 200 proceeds to step 210 to perform a confidence check where the systems requests the user to indicate if a trailer is connected. If no safety related action is involved, routine 200 proceeds directly to step 214 to perform one or more vehicle features. Following step 210, routine 200 proceeds to decision step 212 to determine if a user input has been received and if not, returns to step 210. Once the user input is received, routine 200 proceeds to step 214 to activate one or more vehicle features or vehicle functions before ending at step 216.

Figure 11:
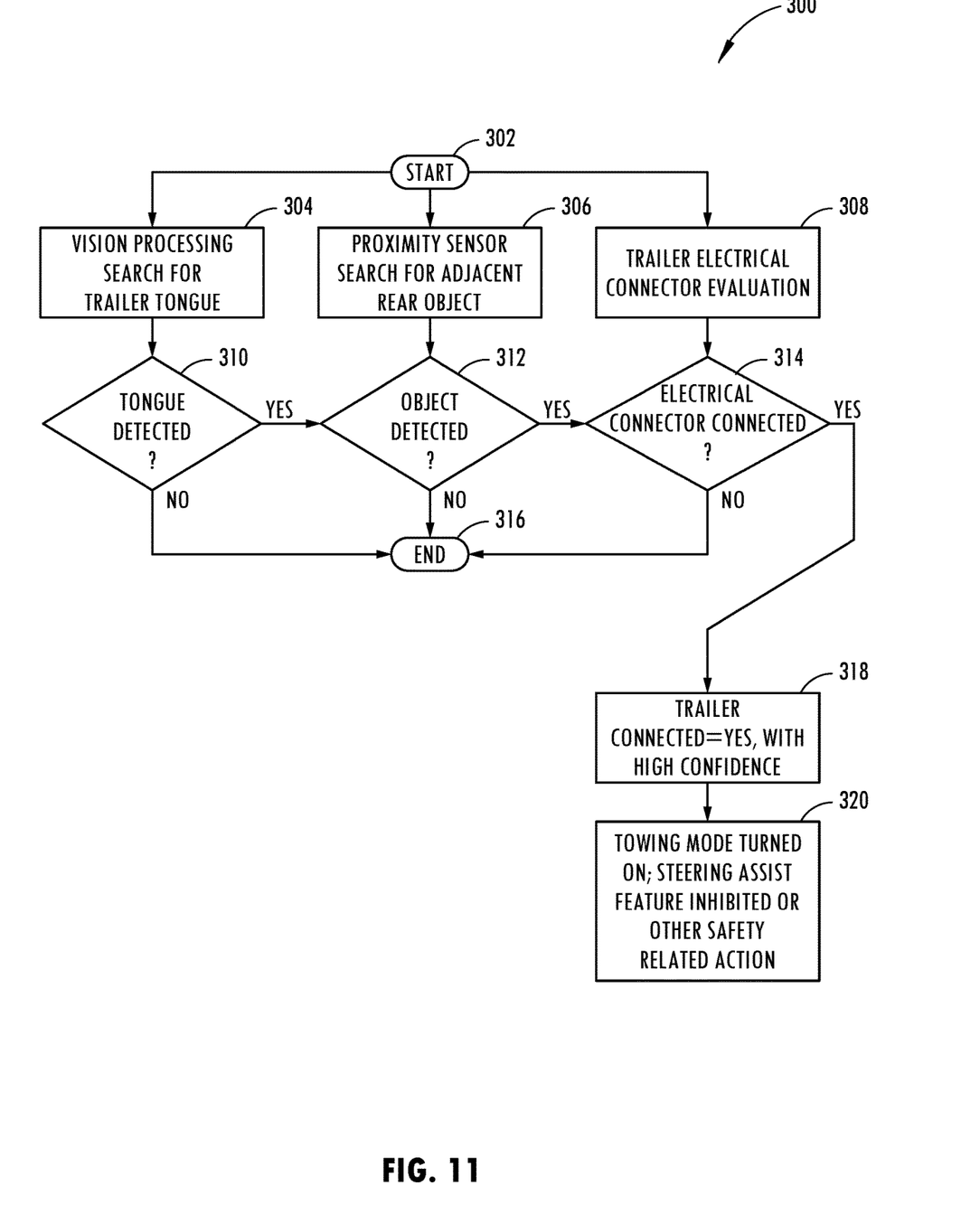
FIG. 11 is a flow diagram illustrating a routine for detecting the vehicle trailer connection status, according to one example.

Referring to FIGS. 11-15, various examples of a trailer connection detection routine 300 are illustrated depending upon the signals generated by various detection systems. In FIG. 11, routine 300 starts at step 302 and proceeds to each of step 304 which conducts a vision processing search for a trailer tongue, step 306 which searches for adjacent rear objects with the proximity sensors and step 308 which evaluates a trailer to vehicle electrical connector connection. Following the execution of block 304, routine 300 proceeds to decision step 310 to determine if the trailer tongue has been detected and, if not, ends at step 316. If the trailer tongue has been detected, routine 300 proceeds to step 312. Following block 306, routine 300 also proceeds to step 312 to determine if an object has been detected and, if not, ends at step 316. If an object has been detected, routine 300 proceeds to step 314. Following step 308, routine 300 also proceeds to step 314 to determine if a trailer electrical connector is connected to the vehicle electrical connector and, if not, ends at step 316. If a trailer electrical connector is determined to be connected to the vehicle electrical connector, routine 300 proceeds to step 318 to determine that the trailer is connected to the vehicle with a high confidence level and sets a trailer connected flag to "yes" with high confidence. Thereafter, routine 300 proceeds to step 320 to turn on the towing mode, inhibit a steering assist feature or perform safety related vehicle actions or functions.

Figure 12:
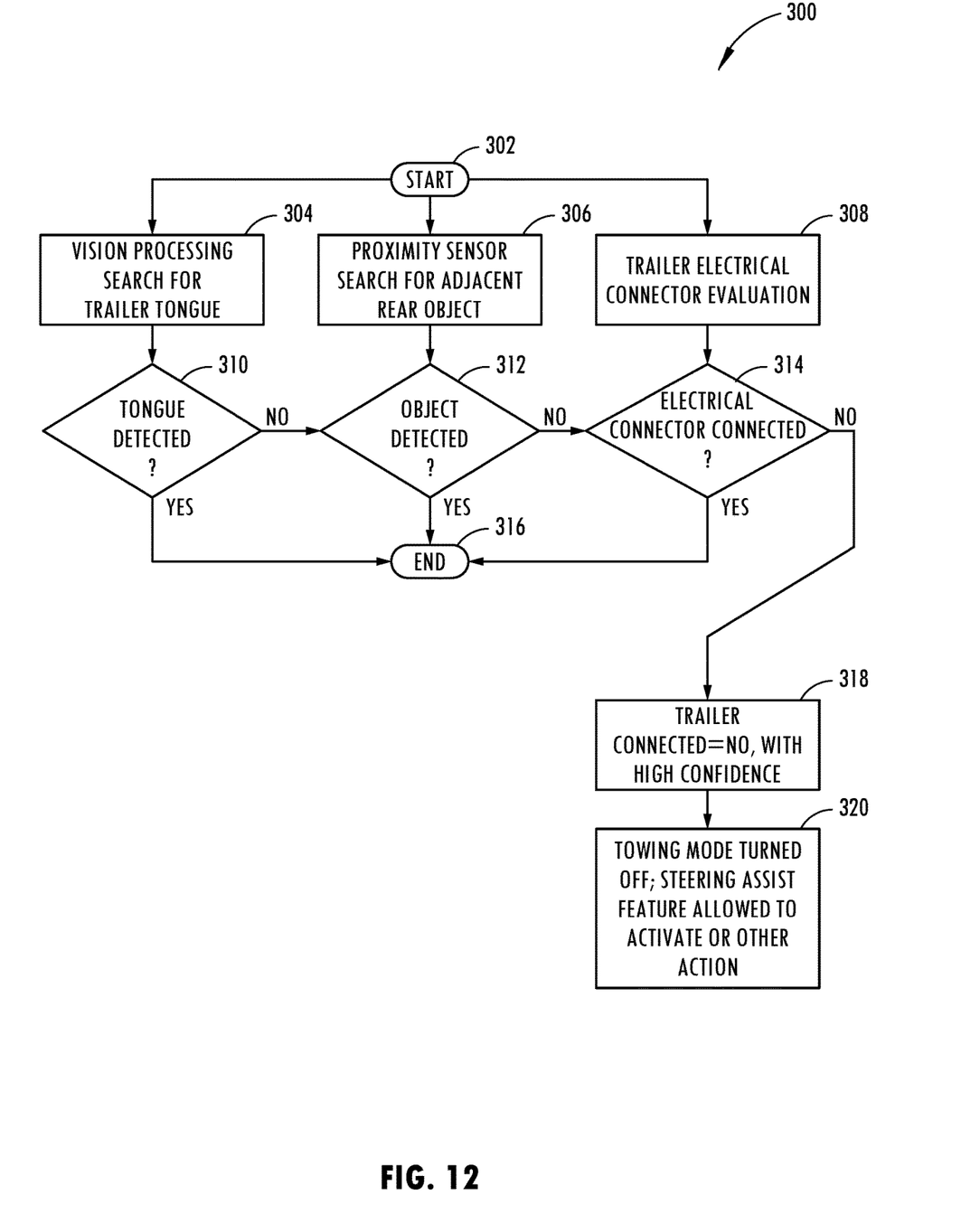
FIG. 12 is a flow diagram illustrating a routine for detecting the vehicle trailer connection status, according to one example.

Referring to FIG. 12, routine 300 is shown in another example in which the image processing system does not detect a trailer tongue detected, the proximity sensor system does not detect adjacent rear objects and the trailer electrical connection system does not detect an electrical connection of the trailer to the vehicle. In this scenario, routine 300 proceeds to step 318 to establish that the trailer is not connected to the vehicle with a high confidence level and may set a trailer connected flag to "no" with high confidence. Thereafter, a towing mode may be turned off, a steering assist feature may be allowed to activate or other actions may be performed in step 320.

Figure 13:
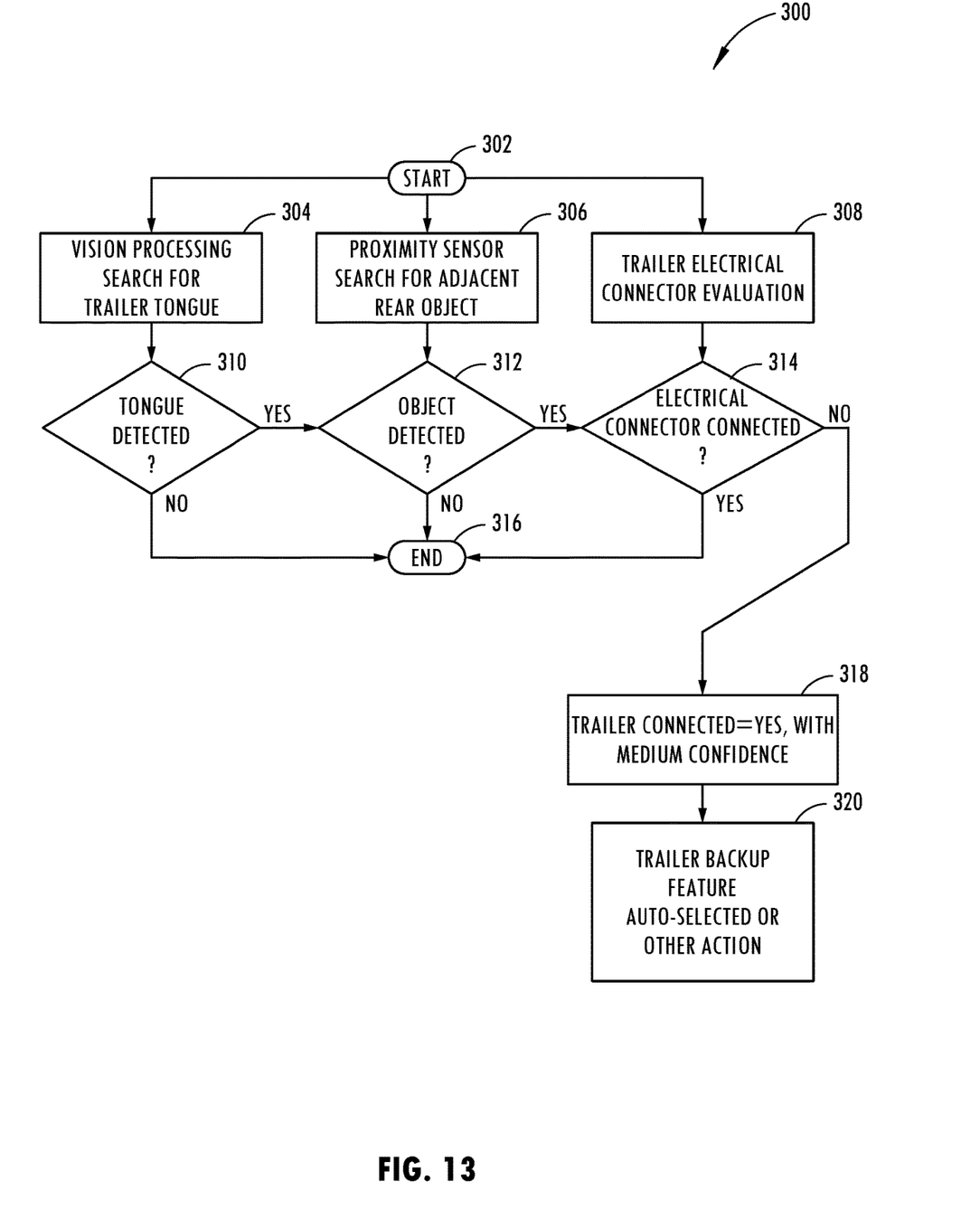
FIG. 13 is a flow diagram illustrating a routine for detecting the vehicle trailer connection status, according to one example.

Referring to FIG. 13, routine 300 is shown in which the imaging system detects a trailer tongue, the proximity sensing system detects an adjacent rear object, but the trailer electrical connector system does not detect an electrical connection of the trailer electrical connector to the vehicle electrical connector. In this scenario, routine 300 determines that there is a trailer connected to the vehicle with a medium high confidence at step 318 and may set a trailer connected flag to "yes" with medium confidence. Thereafter, at step 320, routine 300 may enable the trailer backup feature to automatically be selected or may perform one or more other actions.

Figure 14:
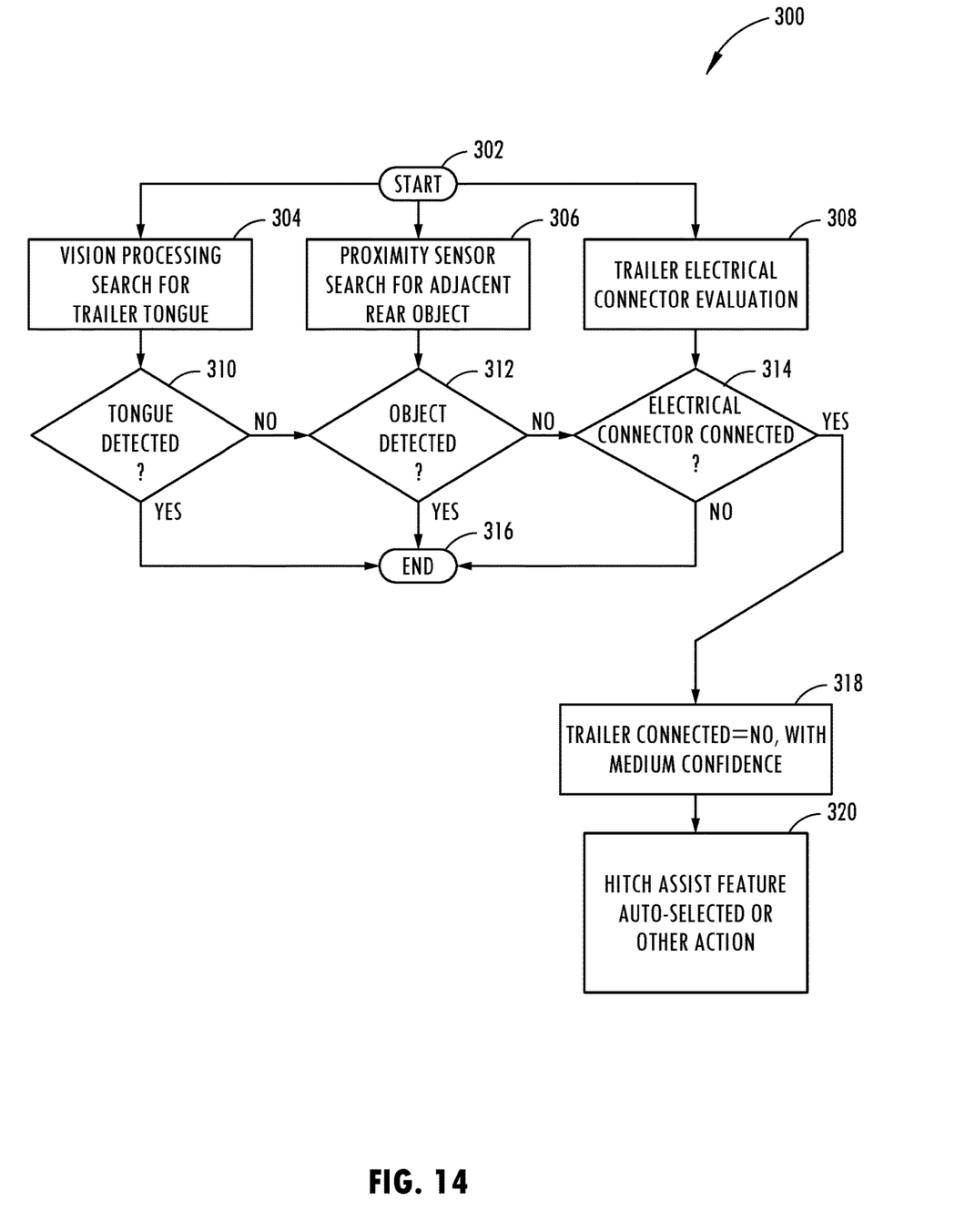
FIG. 14 is a flow diagram illustrating a routine for detecting the vehicle trailer connection status, according to one example.

Referring to FIG. 14, routine 300 is shown according to a further example in which the imaging system does not detect a trailer tongue, the proximity sensing system does not detect an adjacent rear object and the trailer electrical connector system detects an electrical connection of the trailer to the vehicle. In this scenario, routine 300 determines that there is no trailer connected with a medium confidence and may set a flag to "no" with medium high confidence at step 318. Next, at step 320, routine 300 may allow the hitch assist feature to automatically be selected or other action may be executed.

Figure 15:
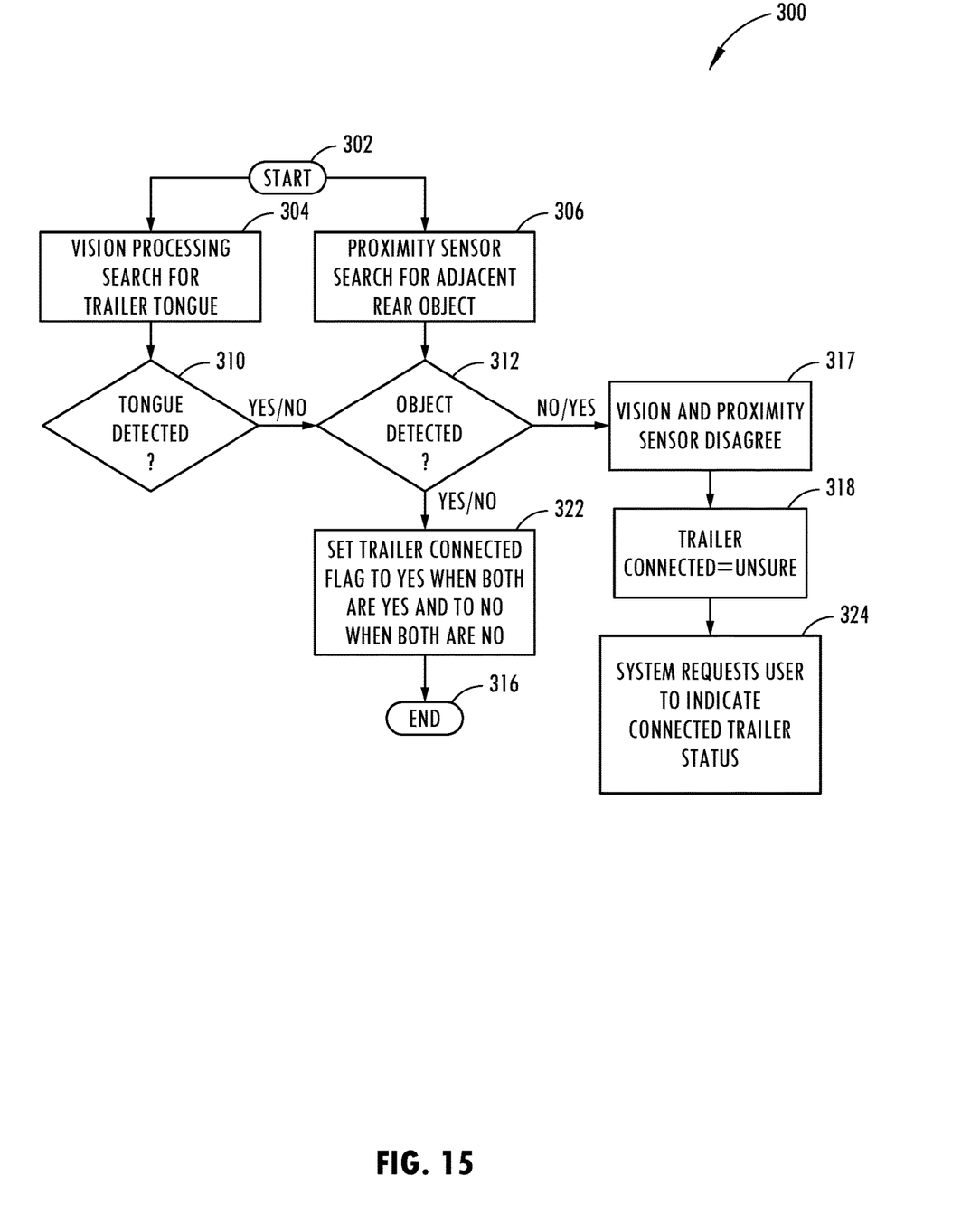
FIG. 15 is a flow diagram illustrating a routine for detecting the vehicle trailer connection status, according to one example.

Referring to FIG. 15, routine 300 is shown according to a further example in which in one scenario, the imaging system detects a trailer tongue and the proximity sensing system detects no adjacent rear objects or another scenario in which the imaging system does not detect a trailer tongue and the proximity sensing system detects adjacent rear objects. In either of these scenarios, routine 300 proceeds to step 317 to determine that the vision and proximity sensing system disagree. Thereafter, at step 318, the trailer connection is determined to be unsure. Following step 318, routine 300 proceeds to step 324 to request the user to indicate the connected trailer status. In the event that the image processing system detects a trailer tongue and the proximity sensor system detects an adjacent rear object, routine 300 proceeds to step 322 to set the trailer connected flag to yes. If the imaging processing system does not detect a trailer tongue and proximity sensing system does not detect adjacent rear objects, routine 300 at step 322 sets the trailer disconnected flag for no, before ending at step 316.

It should be appreciated that the logic for determining the trailer connected or disconnected states with respect to the vehicle may use a lookup table, according to one embodiment.

Accordingly, the vehicle 10 and trailer connection detection system 20 for detecting a trailer connected or disconnected state advantageously provides for an indication of the state of a trailer connection and generates an output that may allow for a warning or other action to be provided to the driver of the vehicle indicating that the trailer is not fully connected to the vehicle 10 such that a trailer and vehicle disconnect state may be addressed. It should be appreciated that the vehicle and system may be employed for trailer towing in general. Additionally, the system may be more specifically employed for a hitch assistance system (also referred to as a "hitch assist") system which assists with hitching the trailer to the vehicle. In such a situation, a driver of the vehicle is assisted with the process such that driver may inadvertently forget to fully connect the trailer to the vehicle upon completion of the vehicle trailer connection process.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a trailer hitch;
    a vehicle electrical connector configured to electrically connect to a trailer electrical connector;
    an imaging system oriented to captures images proximate to the trailer hitch;
    a proximity sensing system arranged to sense one or more objects proximate to the trailer hitch and generate a proximity signal;
    an electrical connection detection system configured to detect an electrical connection of the trailer electrical connector to the vehicle electrical connector and generate an electrical connection signal; and
    a controller processing the captured images, the proximity signal and the electrical connector signal and determining a connection state of a trailer to the vehicle based on the captured images, the proximity sensor and the electrical connector signal, and generating an output indicative of the determined connection state, wherein the controller further assigns a weighted value to each of the captured images, the proximity signal and the electrical connector signal and determines the connection state based on the weighted signals, and wherein the controller determines that the vehicle is at a standstill and assigns a different second set of weighted values when the vehicle is at standstill as compared to when the vehicle is moving.

2. The vehicle of claim 1, wherein the weighted values comprise a first set of weighted values when the vehicle is moving.

3. The vehicle of claim 1, wherein the imaging system comprises a camera.

4. The vehicle of claim 1, wherein the proximity sensor system comprises one or more radar sensors for detecting one or more corners of an object trailer rearward of the vehicle.

5. The vehicle of claim 1, wherein the controller further detects a target on a trailer in the captured images and assigns a weighted value to the target detection, wherein the determined state is further based on the target signal of the detected target.

6. The vehicle of claim 1, wherein the electrical connection detection system detects the trailer electrical connector and a yaw rate sensor connector.

7. The vehicle of claim 1 further comprising a display for displaying the output as a warning to a driver of the vehicle.

8. The vehicle of claim 1, wherein the trailer hitch comprises a tow ball.

9. A trailer detection system for a vehicle comprising:
    an imaging system oriented to captures images proximate to a trailer hitch on the vehicle;
    a proximity sensing system arranged to sense one or more objects proximate to the trailer hitch and generate a proximity signal;
    an electrical connection detection system configured to detect an electrical connection of the vehicle electrical connector to a trailer electrical connector and generate an electrical connection signal; and
    a controller processing the captured images, the proximity signal and the electrical connector signal and determining a connection state of a trailer to the vehicle based on the captured images, the proximity sensor and the electrical connector signal, and generating an output indicative of the determined connection state, wherein the controller further assigns a weighted value to each of the captured images, the proximity signal and the electrical connector signal and determines a trailer to vehicle connected state based on the weighted signals, wherein the weighted values comprise a first set of weighted values when the vehicle is moving, and wherein the vehicle controller determines that the vehicle is at a standstill and assigns a different second set of weighted values when the vehicle is at standstill as compared to when the vehicle is moving.

10. The trailer detection system of claim 9, wherein the proximity sensor system comprises one or more radar sensors for detecting one or more corners of an object trailer rearward of the vehicle.

11. The trailer detection system of claim 9 further comprising a display for displaying the output as a warning to a driver of the vehicle.

12. A method for detecting a state of a trailer connected to a vehicle, comprising:
    capturing images proximate to a trailer hitch on the vehicle with an imaging system;
    sensing one or more objects proximate to the trailer hitch with a proximity sensing system and generating a proximity signal;
    detecting an electrical connection of a vehicle electrical connector to a trailer electrical connector and generating an electrical connection signal; and
    processing the captured images, the proximity signal and the electrical connector signal and determining a connection state of a trailer to the vehicle based on the captured images, the proximity sensor and the electrical connector signal, and generating an output indicative of the determined connection state, wherein the processing further assigns a weighted value to each of the captured images, the proximity signal and the electrical connector signal and determines a trailer to vehicle connected state based on the weighted signals, wherein the weighted values comprise a first set of weighted values when the vehicle is moving, and wherein the vehicle controller determines that the vehicle is at a standstill and assigns a different second set of weighted values when the vehicle is at standstill as compared to when the vehicle is moving.

13. The method of claim 12, wherein the proximity sensor system comprises one or more radar sensors for detecting one or more corners of an object trailer rearward of the vehicle.

14. The method of claim 12 further comprising the step of displaying the output on a display as a warning to a driver of the vehicle.

* * * * *